Aug. 17, 1926.

R. J. PINKETT 1,596,117

FUSING MACHINE FOR USE IN THE MANUFACTURE OF CHEESE

Filed July 7. 1925     7 Sheets-Sheet 3

Inventor
R. J. Pinkett
By   Attorney
Lester Sargent

Aug. 17, 1926.

R. J. PINKETT 1,596,117

FUSING MACHINE FOR USE IN THE MANUFACTURE OF CHEESE

Filed July 7, 1925

Inventor
R. J. Pinkett
By Attorney
Lester L. Sargent

Aug. 17, 1926.
R. J. PINKETT
1,596,117
FUSING MACHINE FOR USE IN THE MANUFACTURE OF CHEESE
Filed July 7, 1925 7 Sheets-Sheet 6
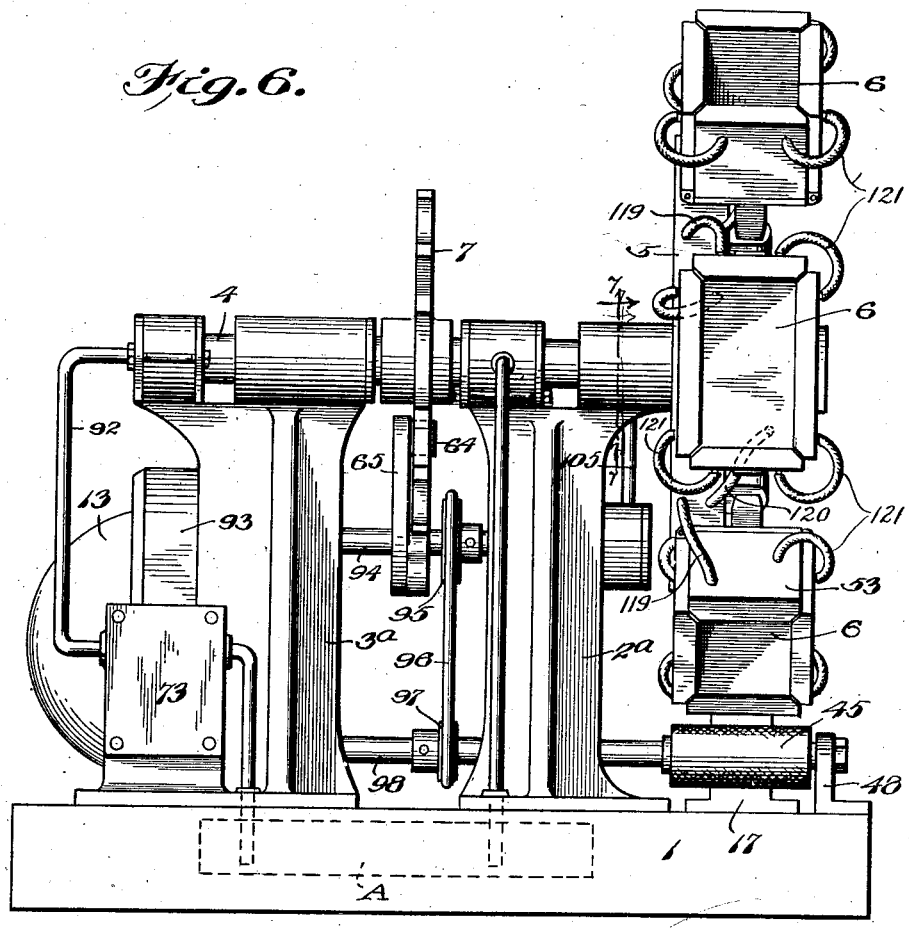
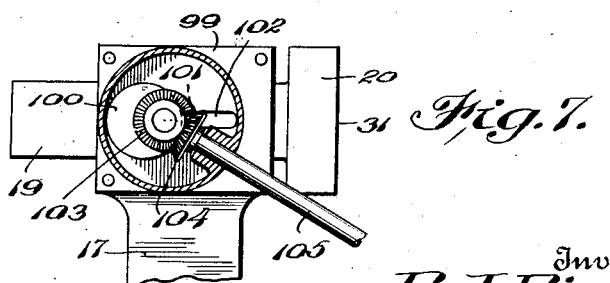
Inventor
R. J. Pinkett
By Attorney Aug. 17, 1926.
R. J. PINKETT
1,596,117
FUSING MACHINE FOR USE IN THE MANUFACTURE OF CHEESE
Filed July 7, 1925     7 Sheets-Sheet 7
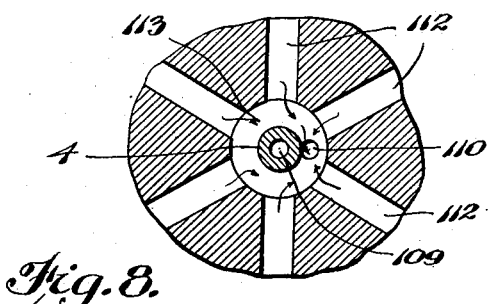
Fig. 8.
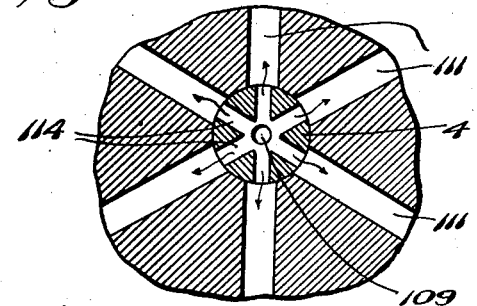
Fig. 9.
Fig. 11.
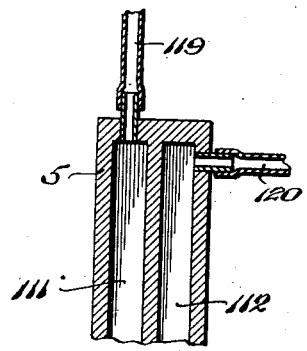
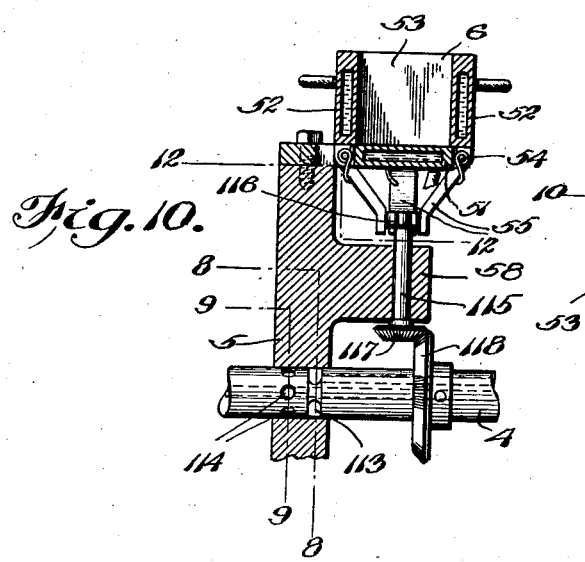
Fig. 10.
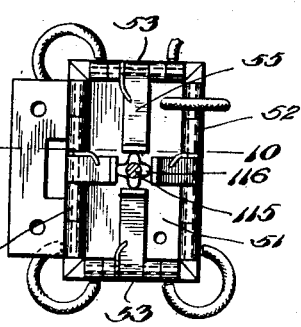
Fig. 12.
Inventor
R. J. Pinkett,
By Attorney Patented Aug. 17, 1926.

1,596,117

UNITED STATES PATENT OFFICE.

RICHARD J. PINKETT, OF DENVER, COLORADO.

FUSING MACHINE FOR USE IN THE MANUFACTURE OF CHEESE.

Application filed July 7, 1925. Serial No. 42,096.

The object of this invention is to provide suitable novel and efficient means to protect and keep the cheese from molding without disturbing the original texture of the cheese. Heretofore, in order to protect cheese from mold and decay, it has been necessary to dip the cheese in paraffin or else to cook the cheese for a period of time in order to fill the mold germs. The cooking process spoils the flavor of the cheese and makes it rubbery or tough and indigestible. In the small packages where paraffin is not used it has been found necessary heretofore to add an additional wrapping of parchment paper in an endeavor to keep air from getting to the cheese and causing it to mold. My invention obviates these difficulties by effectively pressing the protecting tinfoil into the cheese and sealing the tinfoil on the cheese so as to eliminate air pockets between the cheese and the tinfoil which might permit mold to form; and also eliminate the use of an additional wrapper to preserve the cheese, thereby reducing the cost of production. A third advantage attained by my invention is that it makes possible a commercial production of packages of cheese properly sealed with only a small percentage of throwbacks or discarded packages, and to preserve and seal the cheese without destroying its original flavor or texture, as is done in the cooking process. Another object of my invention is to provide novel means for imprinting or branding each brick of cheese with a suitable trade mark. It is also an object of my invention to provide a machine of small size and comparatively low cost for use in small creameries, and which is efficient and practical in operation. I attain these and other objects of my invention by the mechanism illustrated in the accompanying drawings, in which—

Fig. 6 is an end view of an improved form of my invention;

Fig. 7 is a detail sectional view on line 7—7 of Fig. 6;

Fig. 8 is a detail horizontal section on line 8—8 of Fig. 10;

Fig. 9 is a detail horizontal section on line 9—9 of Fig. 10;

Fig. 10 is a section on line 10—10 of Fig. 12.

Fig. 11 is a detail sectional view through hollow rotor 5, showing the relation of the radiating channels 111 and 112 and the flexible pipes 119 and 120, respectively; and Fig. 12 is a section on line 12—12 of Fig. 10.

Like numerals designate like parts in each of the several views.

Figure 1:
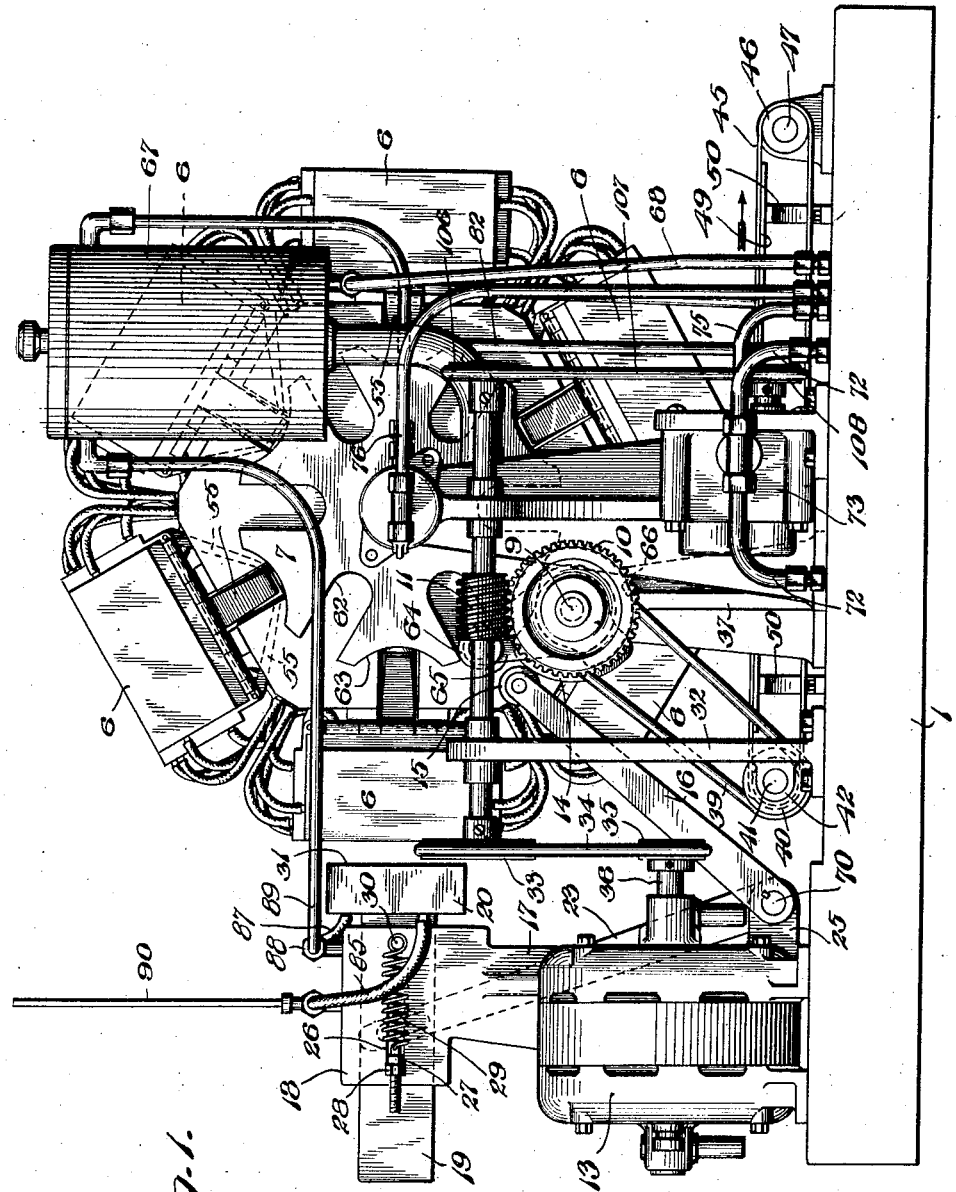
Figure 1 is a side elevation of my invention.

Referring to the accompanying drawings, I provide a hollow base 1 adapted to contain a suitable heated liquid, such as water or oil, or steam, for circulating through and suitably heating the machine. Mounted on the base 1 are standards 2 and 3 which support a hollow main shaft 4 on which is mounted a hollow rotor or revolving turret 5, as shown in Fig. 1. This turret carries collapsible cheese-containing boxes 6. The turret is operated by a Geneva wheel 7 actuated by arm 65 and shaft 9 which latter member carries the arm 65. I provide a worm gear 10 mounted on shaft 9, as shown in Fig. 1, and driven by worm 11 on driving shaft 12.

Figure 2:
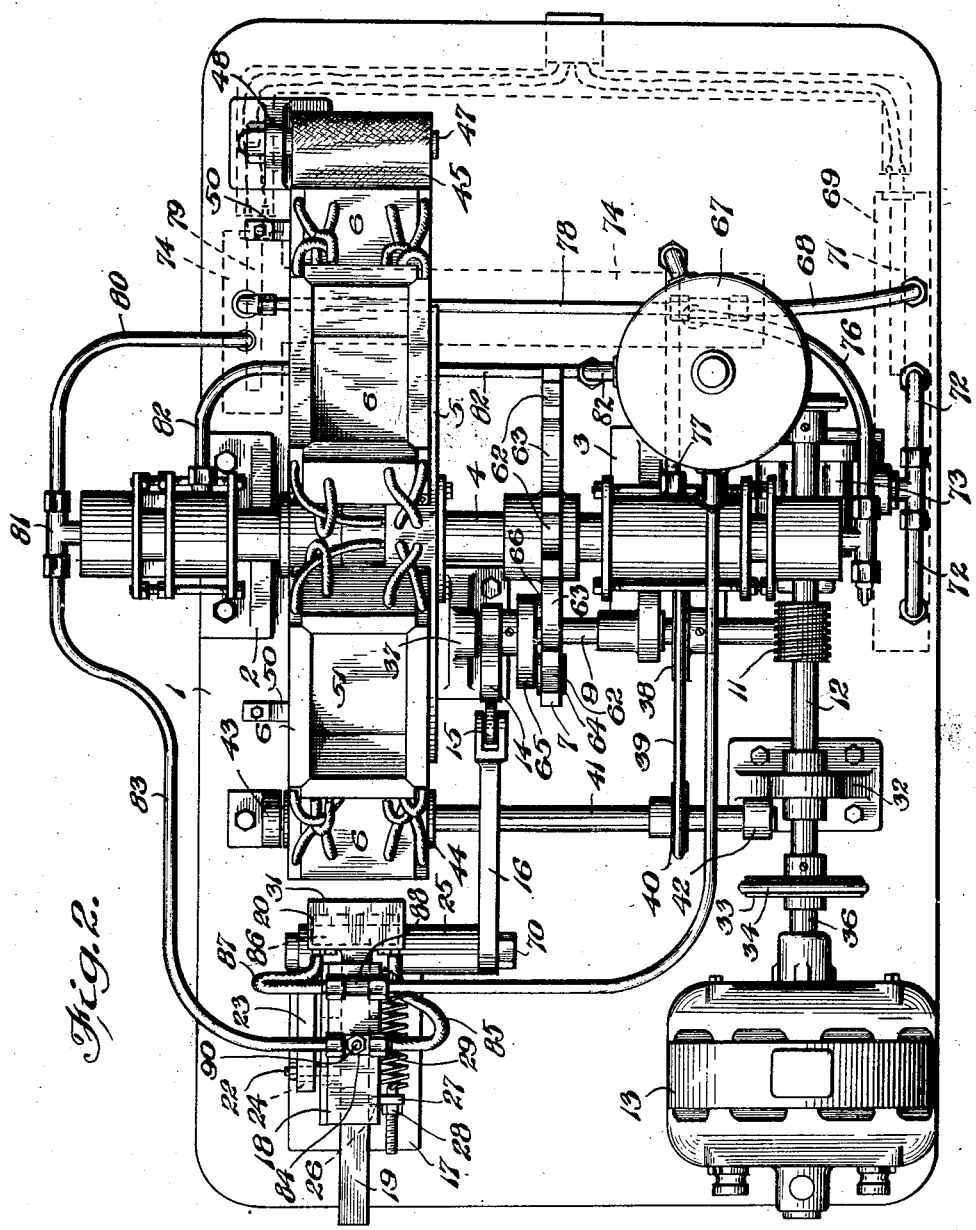
Fig. 2 is a top plan view of same.

The shaft 9 carries a cam 14. In operation, contacting with the cam 14 is a roller 15 revolubly mounted in the bifurcated end of the arm 16, as shown in Figs. 1 and 2. Arm 16 is keyed on to a stub-shaft 70, the shaft 70 being rockably mounted in the extension 25 at the base of plunger standards 17. An arm 23 is keyed on shaft 70 and is provided at its upper end with a slot 24, in which is positioned the finger 22 which extends through slot 21 of plunger casing 18 and is affixed to and travels with the plunger 19. Plunger standard 17 is provided with a plunger casing 18 at its upper end, in which is slidably mounted the plunger 19. Plunger 19 carries a press head 20 on its end, which press head forms the sixth side of the collapsible cheese-container boxes, and the face 31 of this press or plunger head bears the trade mark or brand marking which is to be impressed on the cheese.

In one side of the plunger casing 18, as shown in Fig. 2 is a slot 21. A finger 22 is positioned in the slot 24 of arm 23 and extends through the slot 21 of plunger casing 18 and is affixed to the plunger 19 and travels with it. I provide a slot 26 in plunger casing 18 on the opposite side from slot 24. I also provide a finger 27 carried by plunger 19 and extending through slot 26. Attached to the finger 27 is a tension spring 29, the tension of which may be regulated by the adjusting screw and nut 28. A pin 30 fastens the other end of the tension spring to the plunger casing.

I provide a standard 32 supporting shaft 12. Mounted on the end of shaft 12 is a pulley 33 driven by belt 34 which, in turn, is driven by pulley 35 on motor shaft 36, as shown in Fig. 1.

I provide standards 37 supporting shaft 9. Shaft 9 carries the pulley 38 which drives belt 39, which in turn drives pulley 40 on shaft 41. Shaft 41 is mounted in bearings 42 and 43 respectively. Shaft 41 carries a roller 44 on which is mounted the conveyor belt 45 which also travels over the roller 46. Roller 46 is mounted on shaft 47 which is supported by bearings 48. I provide a supporting table 49 arranged under the top portion of the conveyor belt 45 to prevent the belt from sagging. Table 49 is supported by brackets 50.

Figure 4:
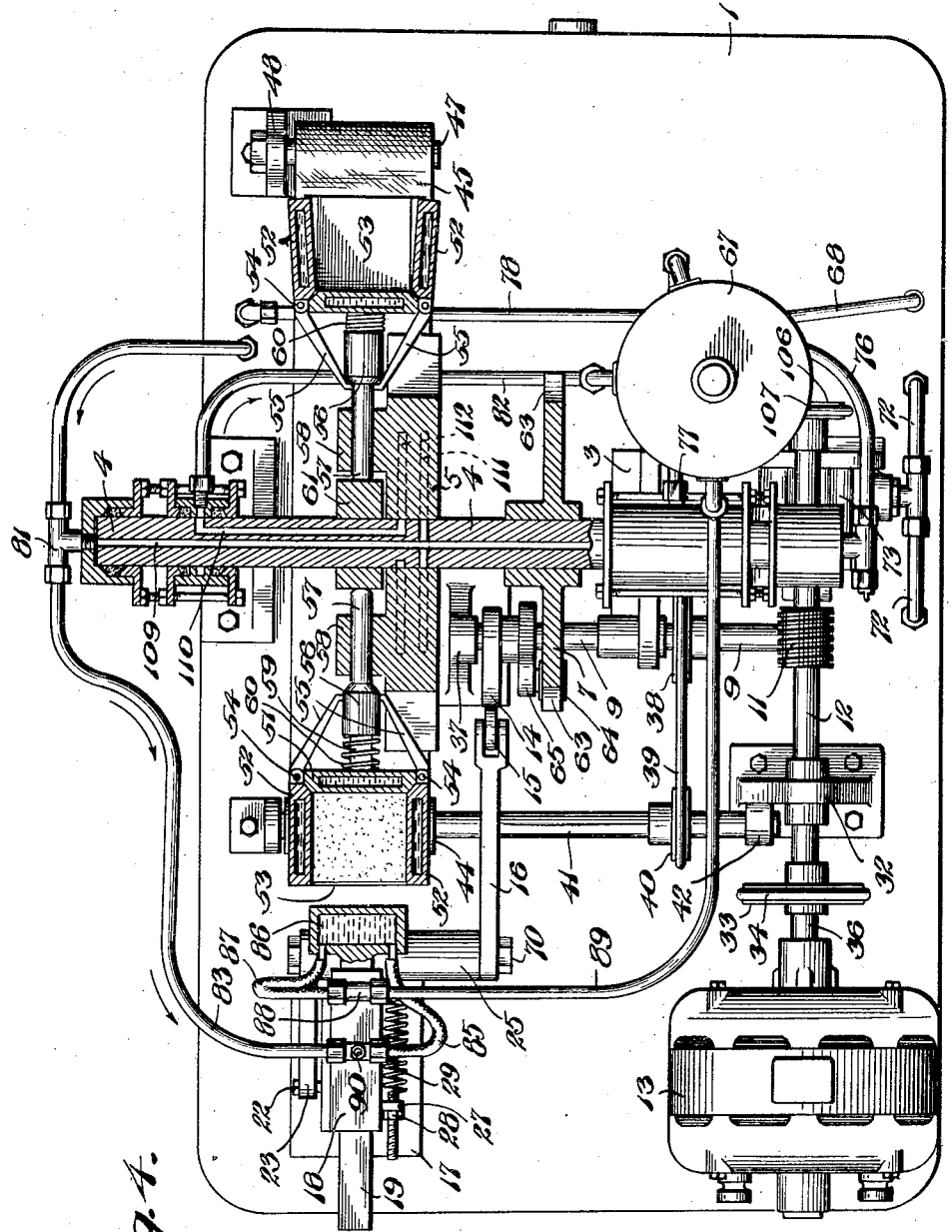
Fig. 4 is a horizontal section, partly in elevation, on a plane extending through the center of main shaft 4.

The details of construction of the collapsible boxes are as follows:

The cheese box has a stationary hollow base 51, hollow sides 52 and hollow ends 53. Swivel spring hinges 54 are provided for the sides and ends of the cheese box. These spring hinges are arranged to spread the sides and ends of the cheese box apart. I provide an extension or finger 55 on each of the sides and ends of the cheese box. Fingers 55 are bent inwardly to permit their ends to slidably contact with the side of a cam plunger 56. The lower end 57 of cam plunger 56 is of reduced size, as shown in Fig. 4. The base 51 of the cheese box has a trunnion 59 slidably mounted in the hollow end of cam plunger 56. An expansion spring 60 is interposed between the base 51 and the end of cam plunger 56. The reduced portion 57 of the cam plunger is slidably mounted in the guide or bearing 58 carried by the rotor and is removably secured in any suitable manner in said bearing. The inner end of member 57 is in operative contact with the cam 61, which cam is keyed on the main shaft 4, as shown in Fig. 4.

Referring to Fig. 1, Geneva wheel 7 is provided with the operating slots 62 and cam portions 63 which are intermittently engaged by the operating wheel 64, which wheel is mounted on the arm 65, the operation of which is controlled by the locking cam 66.

Plunger 19 and its press head are removably mounted in the plunger casing 18, to permit of substituting a plunger having a press head 20 of a different size when cheese boxes of a different size are substituted on the rotor. It is within the contemplation of my invention to provide both cheese boxes of various sizes, and plungers having press heads of correspondingly different sizes, whereby to utilize the machine for the manufacture and packing of bricks of cheese of various sizes by the interchange of the removably mounted cheese boxes and plungers and press heads.

As shown in Fig. 1, I provide a hot water tank or reservoir 67 from which a lead pipe 68, as shown in Fig. 2 extends to the base 1 and connects with a chamber 69, as shown in dotted lines in Fig. 2, where the liquid is heated by means of a suitable electrical heating device 71. From the chamber 69 the hot liquid is pumped through pipe 72 by means of a pump 73 and through pipe 75 to a second heating chamber 74 and thence through pipe 76 to the end of the hollow shaft 4, as shown in Fig. 4. Exhaust pipe 77 carries the return liquid to the tank or reservoir 67. As shown in Fig. 2 I provide a pipe 78 opening out of tank 67, which carries the liquid to the chamber 74 where it is heated by a suitable electrical heating device 79. It is thence conducted through pipe 80 to the T-connection 81 on the opposite end of hollow shaft 4. Pipe 83 carries the hot liquid to connection 84 and through flexible pipe 85 to chamber 86 in the head of plunger 19. The liquid is then returned through flexible pipe 87, connection 88 and return pipe 89, back to the tank 67.

Figure 3:
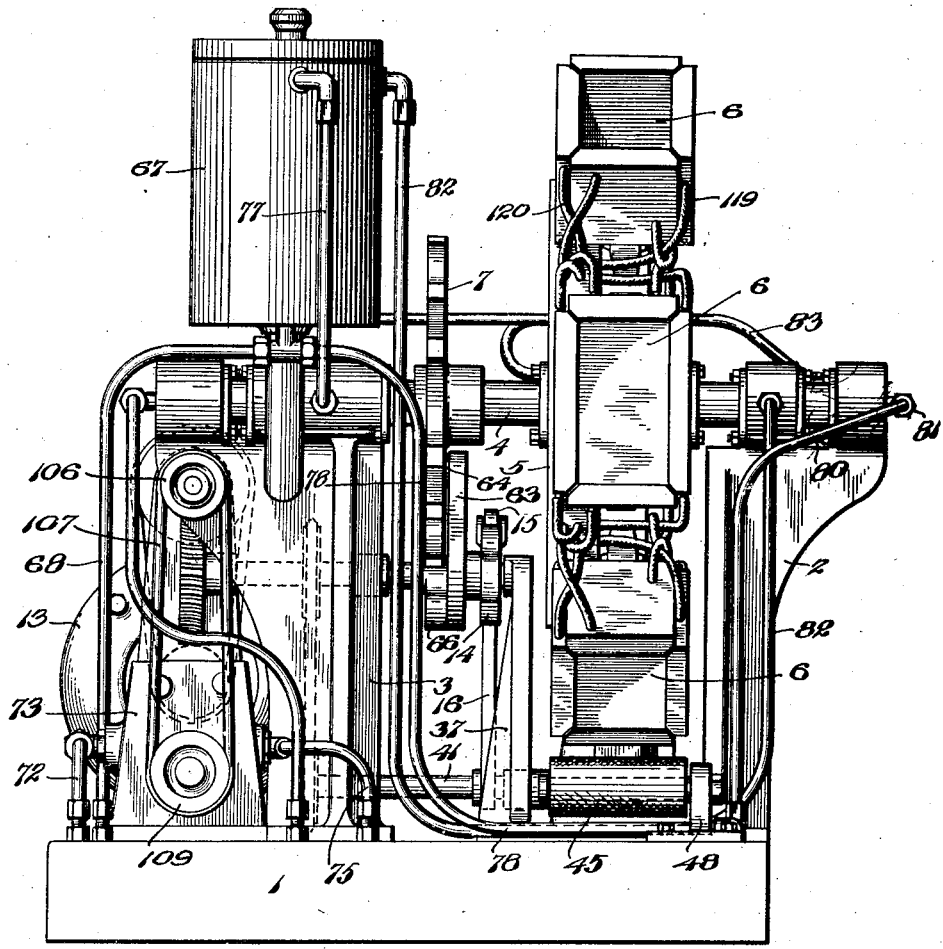
Fig. 3 is an end view.

A pipe 82 which is in communication with the hollow shaft 4, as shown in Fig. 2, carries the return liquid from hollow shaft 4 back to the water heating chamber 67, as will be understood by referring to Figs. 2 and 3. The electrical heating elements 71 and 79 may be any suitable conventional electrical heating devices and may be suitably connected to a standard plug which may be connected with an electrical circuit, as indicated in dotted lines in Fig. 2.

Referring to Figs. 4, 8, and 9, the hollow shaft 4 is provided with the central passage 109 which communicates with the T-connection 81. The shaft 4 is provided with the radial apertures 114 positioned to communicate with the radial passages 111 in member 58 when the passages are alined, as shown in Fig. 9. Shaft 4 is also provided with an annular groove 113 alined with the radiating passages 112 in member 58, as shown in Fig. 8. The channel 110 which communicates with the annular groove 113 extends through the shaft 4 and communicates with the pipe 82, as shown in Fig. 4.

Referring to Fig. 6, a modified form of my invention is illustrated. The two standards 2ª and 3ª are mounted in close relation to each other, supporting the Geneva wheel 7 between them, mounted on the hollow shaft 4. Outwardly of the standard 2ᵃ is mounted the rotor 5 carrying the cheese boxes 6. This form of my invention permits of ready removal of the rotor and its connected parts for interchange of cheese boxes of different sizes. In this form a single circuit of hot liquid is supplied to the heating chambers forming the sides of the cheese boxes by means of a pump 73 and through pipes 92 to the end of the hollow shaft 4, and thence through the hollow rotor 5 and flexible pipes 119 to the hollow sides of the cheese boxes, the liquid flowing through pipes 121 from one side of the cheese box to another and finally returning through pipes 120 to channel 112 to rotor 5. The liquid-heating reservoir A is shown in dotted lines as a part of the base 1, the liquid being heated in it by any suitable electrical device, as in the other form of my invention. The motor 13 through a worm and pinion (not shown) drives the shaft 94 carrying the operating roller and cam of the Geneva movement.
Also mounted on shaft 94 is a pulley 95 connected by means of belt 96 to a pulley 97 mounted on shaft 98 (corresponding to shaft 41 in the other form of my invention). This shaft 98 drives the conveyor belt 45 in the same manner as in the other form of my invention. I provide a modified form of the plunger operating mechanism in which a gear casing 99 is provided mounted on standard 17. Contained in gear casing 99 is a gear-operated cam 100 which operates against a finger 101 which extends through a slot 102 into the gear casing. The gear 103 is driven by a meshing gear 104 mounted on the end of shaft 105, which shaft carries another gear meshing with a gear on the end of shaft 94, by means of which mechanism shaft 105 is driven from shaft 94. As shown in Fig. 1, the pump 73 is driven from the shaft 12 by means of a pulley 106 connected by a belt 107 to pulley 108 on the pump. The radial channels 111 communicate through flexible pipes 119 with the hollow sides of the cheese boxes 6, as shown in Figs. 3 and 5; similarly, radial channels 112 communicate through flexible pipes 120 with the opposite hollow sides of the cheese boxes 6, as shown in Fig. 3.

Referring to Figs. 10 and 12, there is illustrated a modified cam mechanism for causing the walls of the cheese boxes to swing to their outwardly slanting or open position at predetermined intervals. To accomplish this result I provide the mutilated gear 18 mounted on shaft 4 and meshing with a gear 117 on the stub shaft 115, mounted on the guide or bearing 58 of the rotor 5. The stub shaft 115 is provided with a four-leafed cam 116, the leaves of which engage fingers 55 to hold the walls 52 and 53 of the cheese boxes 6 in their normal closed position, the cam allowing the walls to swing to their outward position, operated by the spring hinges 54 when the cam is rotated intermittently in the sequence of the operation of the machine as controlled by the Geneva wheel and associated mechanism hereinbefore described.

Figure 5:
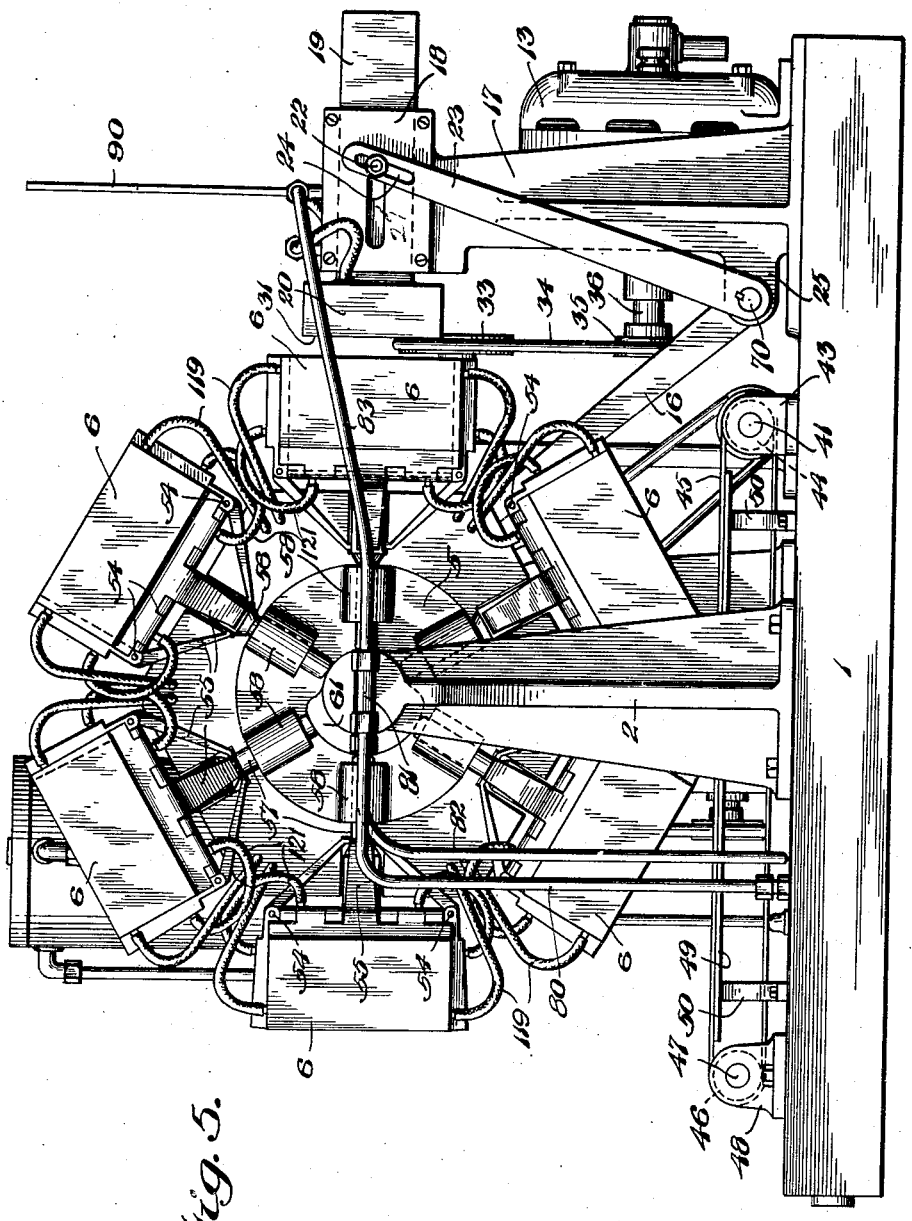
Fig. 5 is a side elevation viewed from the opposite side of the machine from Fig. 1.

In operation the liquid used for heating, which may be either oil, water, steam or other fluid, is first heated in the hot water heating tank and is pumped into the end of hollow shaft 4 and thence through channel 111 and flexible pipe 119 to the hollow sides 52 and bottoms 51 of the cheese boxes and returning through flexible pipes 120 to channel 112 and thence through passage 110 to pipe 82 and back to the hot water tank 67, as will appear by referring to Figs. 4, 5, and 11 of the drawings.

The hollow main shaft carries the rotor on which the series of radiating cheese boxes are mounted, and is driven from a suitable source of power such as the electric motor 13, as illustrated in Fig. 2. The operation of the rotor is intermittent, its rotation being governed by the Geneva wheel mounted on main shaft 4 and controlled by the Geneva movement illustrated in Figs. 1, 2, and 3. The cheese boxes are provided with hollow walls in which the hot liquid may be circulated. A plunger having a hollow press head is provided to function as the sixth wall of the cheese boxes, and hot liquid is also circulated through this hollow press head. The sides and ends of the cheese boxes are tiltably mounted so that they may be tilted outward to a slight degree at predetermined intervals and at other predetermined intervals brought back to their normal position in which they will press the tinfoil in which the blocks of cheese have already been encased, tightly upon the cheese; and the plunger carrying the hot press head will, at regular intervals, be moved down to form the sixth side of the cheese box and pack the cheese tightly and at the same time impress the trade mark on the encased block of cheese.

After the brick of cheese has been compressed by the press head, as the rotor 5 revolves the sides and ends of the cheese boxes are automatically spread apart and the cheese is deposited on the conveyor 45 and carried to one end of the machine where it is collected by the operator.

The temperature of the walls of the cheese box, together with the spring tension of the plunger is sufficient to press the cheese into a compact mass and draw a light film of oil or melted butter fat from the cheese into contact with the tin foil. This procedure eliminates additional wrappings and this saves expense by using less material and elimination of labor. The heating of the cheese obviates the formation of an inedible rind on the cheese and makes possible the sanitary sealing of the package. It also destroys mold germs by the application of heat. The machine makes it possible to get quantity production. Any slight irregularity in the brick form of the cheese is eliminated and the trade mark design provided upon the face of the press head is impressed in the tin foil and the cheese.

What I claim is:

1. In a machine of the class described, the combination of an open box adapted to receive a block of cheese, and means for heating the walls of the box for the purposes hereinbefore described.

2. In a device of the class described, the combination of an open sided box, a slidable plunger adapted to function as the sixth side of the box and means for sliding the plunger into a position to press the cheese compactly into brick form.

3. In a device of the class described, the combination of an open sided box, a slidable plunger adapted to function as the sixth side of the box, means for sliding the plunger into a position to press the cheese compactly into bricks, and means for heating the sides of the box and press head of the plunger.

4. In a device of the class described, the combination of an open-sided box having all its walls hollow, means for circulating a hot liquid within the hollow walls, a suitably mounted plunger having a hollow press head adapted to function as the sixth side of the box and means for circulating a hot liquid through the plunger, whereby to fuse the tinfoil wrapping of the cheese on the cheese to effectively seal same.

5. In combination with the device described in claim 4, means for swinging the sides of the box to a slightly outwardly slanting position.

6. In combination with the device described in claim 4, means for swinging the sides of the box to a slightly outwardly slanting position at predetermined intervals.

7. In a device of the class described, the combination of a rotor, a plurality of cheese boxes radially mounted on the rotor, each of the cheese boxes having outwardly swingable hollow sides to permit of the convenient insertion of a cheese and its discharge from the boxes, means for operating the swingable sides of the cheese boxes to an open and subsequently to a closed position at predetermined intervals, a slidably mounted plunger having a press head adapted to function as the sixth side of the box to compress the cheese compactly in the boxes, and means for operating the plunger at predetermined intervals as successive cheese boxes are brought into position opposite the press head.

8. In combination with the apparatus described in claim 7, means for circulating a hot liquid continuously through the sides of the cheese boxes and through the press head to effectually seal the tinfoil wrapper on the blocks of cheese.

9. In combination with the apparatus described in claim 7, means for circulating a hot liquid continuously through the sides of the cheese boxes and through the press head to effectually seal the tinfoil wrapper on the blocks of cheese, and a shaft on which the rotor is mounted, a Geneva wheel and associated mechanism causing the shaft to rotate only at predetermined intervals, the intervals being co-ordinated with the movement of the plunger operating the press head, as and for the purposes described.

10. In an apparatus of the class described, the combination of a series of hollow-walled cheese boxes, a rotor on which said cheese boxes are mounted, a shaft carrying the rotor, a Geneva wheel and associated mechanism controlling the operation of the shaft and rotor, a tank containing a hot liquid, conduits for conducting the hot liquid to the walls of the cheese boxes, a pump to maintain a continuous circulation of the hot liquid through the walls of the cheese boxes, a slidable plunger carrying a hollow press head, conduits for circulating the hot liquid through the hollow press head, and means for intermittently operating the plunger to compactly compress the cheese into the cheese boxes at predetermined intervals as the rotor revolves and brings successive cheese boxes into position opposite the press head.

11. In combination with the apparatus described in claim 10, a conveyor mounted under the cheese boxes and adapted to receive the packages of cheese as they are discharged from the lowermost cheese boxes, and a supporting plate under the central portion of the conveyor belt to prevent sagging of the same.

12. In combination with the apparatus described in claim 10, means for swinging opposite sides of the cheese boxes to a slightly outwardly slanting position at predetermined intervals to facilitate the depositing of the packages of cheese in the boxes and their discharge therefrom.

13. In combination with the apparatus disclosed in claim 10, electrical heating devices for heating the liquid which is circulated through the walls of the cheese boxes and through the press head.

14. In combination with the apparatus described in claim 10, means adapted to permit of substituting cheese boxes of different sizes on the rotor, whereby to permit the use of the machine for more than one size blocks of cheese.

15. In combination with the apparatus described in claim 10, means adapted to permit of substituting cheese boxes of different sizes on the rotor, whereby to permit the use of the machine for more than one size of blocks of cheese, and means for substituting a plunger carrying a press head of different sizes for use when different sizes of cheese boxes are substituted.

16. In an apparatus of the class described, the combination of a rotor, a hollow shaft on which the rotor is mounted, a series of cheese boxes removably mounted on the rotor, the cheese boxes having hollow walls and having opposite sides of each cheese box mounted for outwardly swingable movement, means for outwardly swinging said sides of the cheese boxes at predetermined intervals, a slidably mounted plunger having a hollow press head of suitable size to form the sixth side of the cheese boxes, resilient means for normally retaining the plunger in retracted position, means for driving the plunger into position to compress the cheese compactly into the oppositely positioned boxes at predetermined intervals, one or more tanks for containing a heated liquid, means for heating the liquid in the tanks, conduits for continuously circulating the liquid through the hollow press head and through the hollow sides of the cheese boxes, said conduits including flexible portions leading to the press head and to the movable walls of the cheese boxes, whereby said walls and press head may be operated without interfering with the continuous circulation of the hot liquid and means for intermittently revolving the rotor carrying the cheese boxes, said intermittent rotation being co-ordinated with the operation of the plunger, substantially as described.

17. In an apparatus of the class described, the combination of a motor, a worm gear drive operatively connecting the motor shaft with a rotor shaft, a Geneva wheel and associated mechanism mounted on the rotor shaft, a rotor on the rotor shaft, hollow-walled cheese boxes removably mounted on the rotor, a removable plunger having a hollow press head adapted to function as the sixth side of the cheese boxes when in a position opposite to the plunger, conduits for circulating hot liquid through the hollow walls of the cheese boxes and through the hollow press head, a tank for containing and heating the liquid, and a pump for maintaining a continuous circulation of the liquid, said pump being operatively connected with the motor.

18. In an apparatus of the class described, the combination of a motor, a rotor shaft, a worm gear drive operatively connecting the motor with the rotor shaft, a Geneva wheel and associated mechanism mounted on the rotor shaft, a rotor on the rotor shaft, hollow-walled cheese boxes removably mounted on the rotor, a removable plunger having a hollow press head adapted to function as the sixth side of the cheese boxes when in a position opposite to the plunger, conduits for circulating hot liquid through the hollow walls of the cheese boxes and through the hollow press head, a tank for containing and heating the liquid, and a pump for maintaining a continuous circulation of the liquid, said pump being operatively connected with the motor.

RICHARD J. PINKETT.